United States Patent [19]
Burylo et al.

[11] 3,883,392
[45] May 13, 1975

[54] NUCLEAR REACTORS AND TO CLOSURE ARRANGEMENTS FOR USE THEREIN

[75] Inventors: Piotr Stanislaw Burylo, Leicester; Dennis John Hughes, Nuneaton, both of England

[73] Assignee: The English Electric Company Limited, London, England

[22] Filed: Dec. 6, 1972

[21] Appl. No.: 312,669

[52] U.S. Cl. ............ 176/60; 176/65; 176/87; 165/74; 165/157
[51] Int. Cl. ............................................ G21c 15/26
[58] Field of Search .......... 176/60, 61, 64, 65, 87; 165/74, 157, 158

[56] References Cited
UNITED STATES PATENTS

| | | | |
|---|---|---|---|
| 3,000,728 | 9/1961 | Long et al. | 165/74 X |
| 3,352,756 | 11/1967 | Lockett et al. | 176/87 X |
| 3,371,017 | 2/1968 | Coast et al. | 176/60 X |
| 3,379,616 | 4/1968 | Vitry | 165/74 X |
| 3,470,066 | 9/1969 | Livsey et al. | 176/60 |
| 3,544,425 | 12/1970 | Shaw et al. | 176/87 X |
| 3,713,972 | 1/1973 | Coast et al. | 176/60 |

*Primary Examiner*—Carl D. Quarforth
*Assistant Examiner*—Roger S. Gaither
*Attorney, Agent, or Firm*—Kirschstein, Kirschstein, Ottinger & Frank

[57] ABSTRACT

A nuclear reactor in which a penetration which houses a heat exchanger of the turbomachinery in the pressure wall of the reactor is closed by a primary closure device which provides a gastight seal across the penetration, and a secondary closure device to limit the escape of gas from the penetration on failure of the primary closure device, wherein the secondary closure device is provided by a waterbox of the heat exchanger. The secondary closure device may have projections engageable with retaining projections of the penetration, the closure device being fitted in position by axial movement followed by a partial rotation to bring the co-operating surfaces of the closure device projections and the retaining projections into engagement.

4 Claims, 4 Drawing Figures

NUCLEAR REACTORS AND TO CLOSURE ARRANGEMENTS FOR USE THEREIN

The present invention relates to nuclear reactors of the kind incorporating turbo-machinery housed in penetrations provided in a pressure vessel wall of the reactor, and relates more particularly to the closure of those penetrations which house heat exchangers of the turbo-machinery.

The penetrations in the pressure vessel wall contain gas, for example helium, at high temperature and pressure. In order to prevent escape of this gas to the atmosphere it is necessary that these penetrations are sealed.

Conventionally, the penetrations are provided with a primary closure device which provides a gastight seal for the penetration, and for reasons of safety a secondary closure device will limit the escape of gas to acceptable proportions until remedial action is taken to replace the primary closure device.

Conventionally the primary closure device and the secondary closure device of such dual closure arrangements, as they will hereinafter be referred to, are pressure plates which are sealed across the penetrations, the primary closure plate providing a gastight seal and the secondary closure plate providing a leakage seal.

According to the present invention, in a nuclear reactor of the kind referred to having a penetration which houses a heat exchanger of the turbo machinery in the pressure wall of the nuclear reactor and in which the penetration is closed by a primary closure device which provides a gastight seal across the penetration, and a secondary closure device to limit the escape of gas from the penetration in the event of rupture of the primary closure device, the secondary closure device is provided by a water-box of the heat exchanger.

Conveniently the penetration is provided at its end with a cylindrical metal liner having the primary closure device, for example in the form of a dished metal plate, sealed across its outer end and the water-box extending across the bore of the liner inwardly of the primary closure device.

The water-box is conveniently provided by a pair of plates sealed together at their edges and shaped to provide a space between them, and a partition preferably separating the space into a feed chamber and a return chamber.

The water-box is preferably provided around its periphery with an annular flange having a plurality of spaced radially-extending projections, the liner is provided internally with an annular ridge forming a seating for the flange, and the water-box is supported within the liner by a plurality of spaced projections which engage the projections of the water-box on the sides remote from the ridge so as to maintain the flange in contact with the ridge.

The width of the spaces between the projections of the liner are conveniently greater than the circumferential width of the water-box projections. This enables the water-box to be fitted into its operative position within the liner by an axial movement to cause the water-box projections to pass between the liner projections into engagement with the ridge, followed by a partial rotation to bring the co-operating surfaces of the water-box and liner projections into engagement. Such an arrangement has application for dual closure arrangements utilising alternative forms of secondary closure devices.

An embodiment of the present invention will now be described by way of example only with reference to the accompanying drawings in which.

Figure 1:
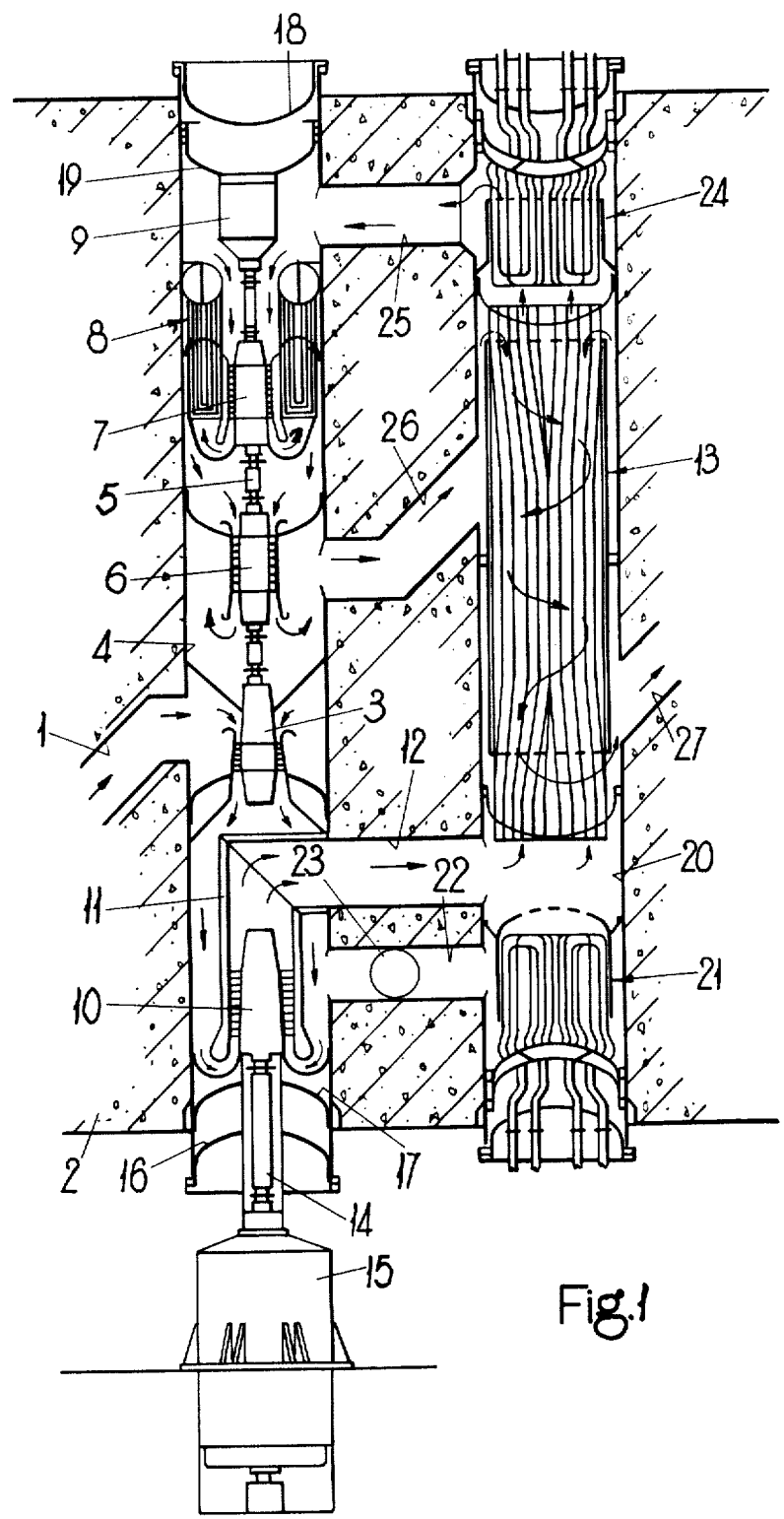
FIG. 1 is a schematic diagram of a turbomachinery arrangement operating in a closed cycle and housed in penetrations in a pressure vessel wall of a nuclear reactor.

Referring now to FIG. 1, helium gas heated by a nuclear core (not shown) of the nuclear reactor is fed from the core through a duct 1 in a pressure vessel wall 2 of the reactor. The gas passes from the duct 1 through a high pressure turbine 3 housed in a bore 4 in the wall 2, the turbine 3 being on a common shaft 5 with, and driving, a high pressure compressor 6 and a low pressure compressor 7, the gas from the low pressure compressor outlet passes through an intercooler 8 to the inlet of the high pressure compressor. Also mounted on the shaft 5 is a starter motor 9.

After being fed through the turbine 3 the gas passes downwardly to the bottom of the bore 4, as viewed in FIG. 1, upwardly through a low pressure turbine 10 housed in an L-shaped duct 11 provided in the bore 4. One branch of the duct 11 acts as an outlet duct and feeds gas from the low pressure turbine 10 via a connecting bore 12 to a recuperator 13.

The turbine 10 is connected on a common shaft 14 with, and drives, an alternator 15. The alternator is mounted vertically outside the pressure vessel wall and the bottom of the bore 4 is closed by a primary closure plate 16 and a secondary closure plate 17. The other end of the bore 4 is similarly closed by a primary closure plate 18 and a secondary closure plate 19.

The primary closure plates 16 and 18 are secured with a gastight seal across the bore 4, and prevent leakage of gas from the bore 4 whilst the secondary closure plates 17 and 19 are provided to limit escape of the gas from the bore 4 in the event that the primary closure plates become no longer gastight. The escape of gas is limited to acceptable proportions until remedial action is taken to replace the ruptured primary closure plates. Since gas may leak past the secondary closure plates 17 and 19, it will be realized that the space between associated primary and secondary closure plates 18, 19 and 16, 17, is filled with gas at the same pressure as the gas within the bore 4 internally of the secondary closure plates 17 and 19. The recuperator 13 is housed in a second bore 20 in the pressure vessel wall extending parallel to the bore 4, the bottom of the bore 20 (as viewed in FIG. 1) housing a heat rejection cooler 21, and the connecting bore 12 opening into the bore 20 intermediate the recuperator 13 and the heat rejection cooler 21. A second connecting bore 22, connects the bore 4 with the heat rejection cooler 21 and this bore 22 houses a bypass valve assembly indicated generally by the reference 23 which is operable to allow the gas to pass directly to the heat rejection cooler 21 without passing through the low pressure turbine 10. The heat rejection cooler cools the gas sufficiently for it to be fed to the recuperator 13.

Such an operation would be effected, for example, if the alternator load was removed from the shaft 14, thus preventing consequent overspeed of the turbine 10.

Situated in the bore 20 above the recuperator 13 is a precooler 24, and gas, after passing upwardly through the recuperator 13, is fed through the precooler 24. The gas is fed from the precooler 24 through a third connecting bore 25 into the bore 4.

The gas then passes through the low pressure compressor 7, the intercooler 8 and the high pressure compressor 6 into a fourth connecting bore 26 which conducts the gas back to the bore 20 so that it may be fed downwardly around the tubes of the recuperator 13 where it is heated by gas passing upwardly through the tubes of the recuperator 13. Finally the gas is fed back to the nuclear core via an outlet duct 27 connecting with the bore 20.

Most of the above-described features are integers of a closed cycle gas turbine system, the operation and function of which is known and will therefore not be further described.

The precooler 24 and heat rejection cooler 21 are of similar construction and are situated one at each end of the bore 20. This bore 20 contains helium gas at high pressure and, like the bore 4, must be provided with primary and secondary closure devices to prevent escape of the gas from the bore 20.

Figure 2:
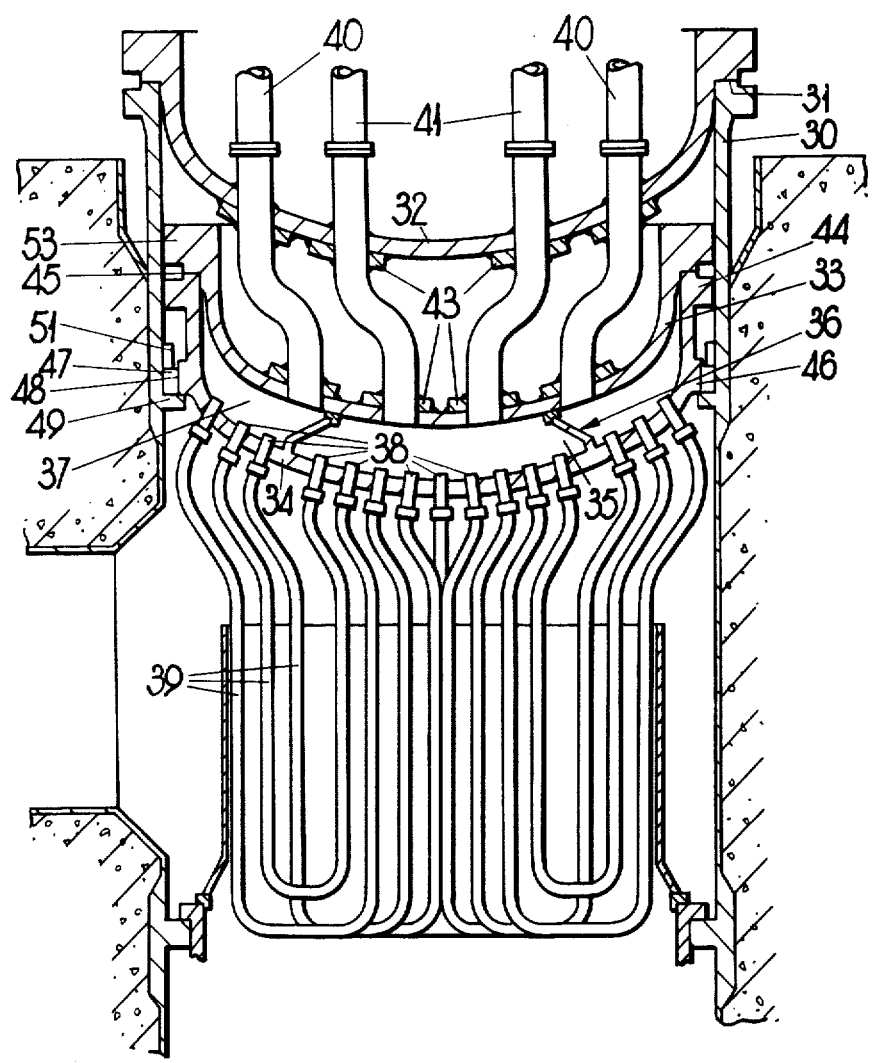
FIG. 2 is an enlarged sectional view of part of FIG. 1 showing a closure arrangement.

The way in which this is achieved will now be described with reference to FIG. 2 which shows in detail the construction of the precooler 24.

The bore 20 is provided with a cylindrical liner 30 across the end of which is bolted and seal welded at 31 a dish-shaped primary closure plate 32 having its convex surface facing inwards as shown. Secured to the steel liner inwardly of the closure plate 32 are dish-shaped plates 33 and 34 also arranged with their convex surfaces facing inwards, the space between the plates 33 and 34 defining a water-box for the precooler 24. This space is divided into an inner chamber 35, radially inward of an annular wall 36 connecting the two plates, and an outer chamber 37 radially outward of the wall 36. Nozzles 38 are welded into apertures in the lower plate 34 and a plurality of U-shaped tubes 39 are connected to the nozzles 38, such that one end of each tube is connected to a nozzle 38 connecting with the outer chamber 37 and the other end of which tube is connected to a nozzle 38 connecting with the outer chamber 37 and the other end of which tube is connected to a nozzle 38 connecting with the inner chamber 35.

Inlet pipes 40 extending through the outer closure plate 32 are welded at their ends in apertures in the plate 33 and supply coolant water to the outer chamber 37. This passes through the U-shaped tubes 39 collecting heat from the gas in the bore 20, and is exhausted into the inner chamber 35. Although each tube 39 is represented in the drawing as a single tube for the sake of clarity, normally these tubes would consist of a plurality of smaller diameter tubes.

The heated water is removed from the chamber 35 through outlet pipes 41 extending through the primary closure plate 32 and welded at their ends to apertures in the plate 33. The pipes 40 and 41 are cranked to compensate for any thermal expansion which they may undergo, and are welded into the apertures in plate 32 through which they pass. Stress compensation plates 43 are welded around all of the apertures in plates 32 and 33.

The water-box, i.e., plates 33 and 34, define the secondary closure device for the bore 20 and their method of fixing is as follows.

Figure 4:
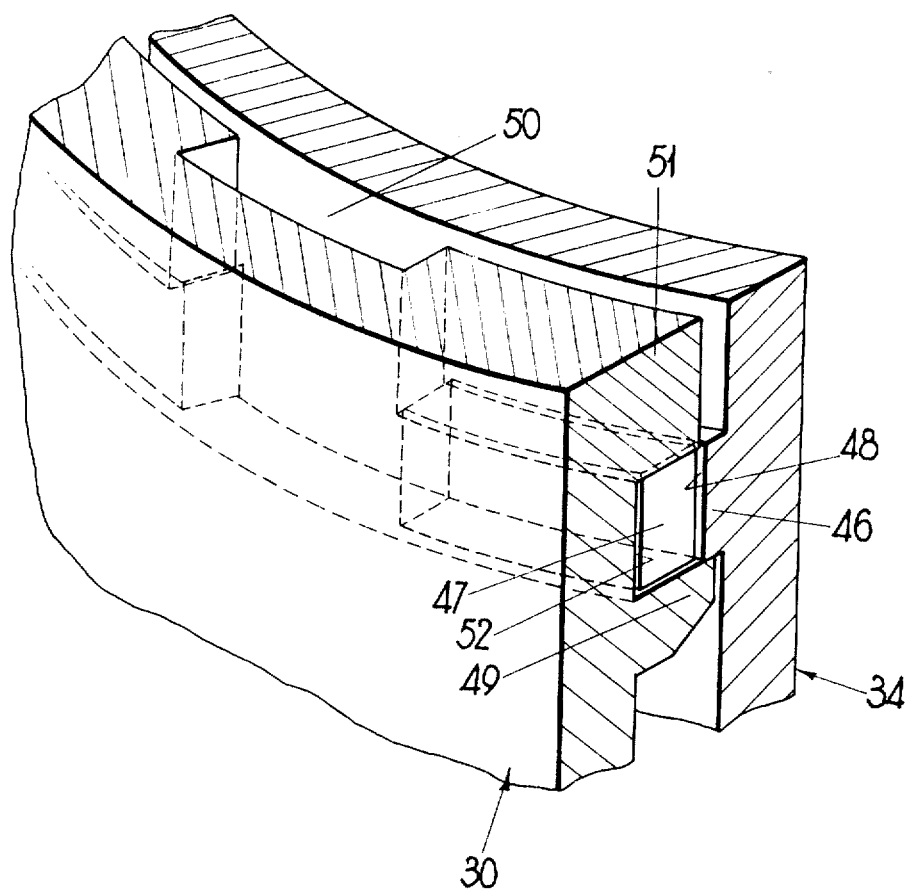
FIG. 4 is a perspective view of a bayonet fixing used in the closure arrangement shown in FIGS. 2 and 3.

The plate 34 has a peripheral flange 44 which is bolted and seal welded to a peripheral flange 53 on the plate 33 at the abutting faces 45. The plate 34 also has a second peripheral flange 46 on whose rim 48 are provided radially extending castellations 47 (see FIG. 4). The flange 46 extends between a solid peripheral ridge 49 and radial castellations 51 spaced from the ridge on the inner surface of the liner 30. The number and spacing of the castellations 51 on the liner are the same as those of the castellations 47 on the flange 46 and when the plate 34 is in its operative position in the liner 30, the castellations 47 on the rim 48 of the flange 46 are located in recesses 52 formed between the castellations 51 and the solid ridge 49 of the liner, the flange 46 abutting against and resting on the solid ridge 49 of the liner 30 as shown.

To insert the plate 34 in position in the liner 30 it is placed in the liner 30 so that the castellations 47 on its flange 46 pass through-gaps 50 between the castellations 51 on the inner surface of the liner and seat against the solid ridge 49. The plate 34 is then rotated with respect to the liner so that the castellations 47, 51 are brought into alignment thereby holding the flange 46 firmly against the ridge 49. This arrangement thus constitutes a bayonet fixing for the plate 34 in the liner 30. The contacting surfaces of the flange 46 and the ridge 49 constitute a seal between the bore 20 and the space between the primary closure plate 32 and the plate 33.

Figure 3:
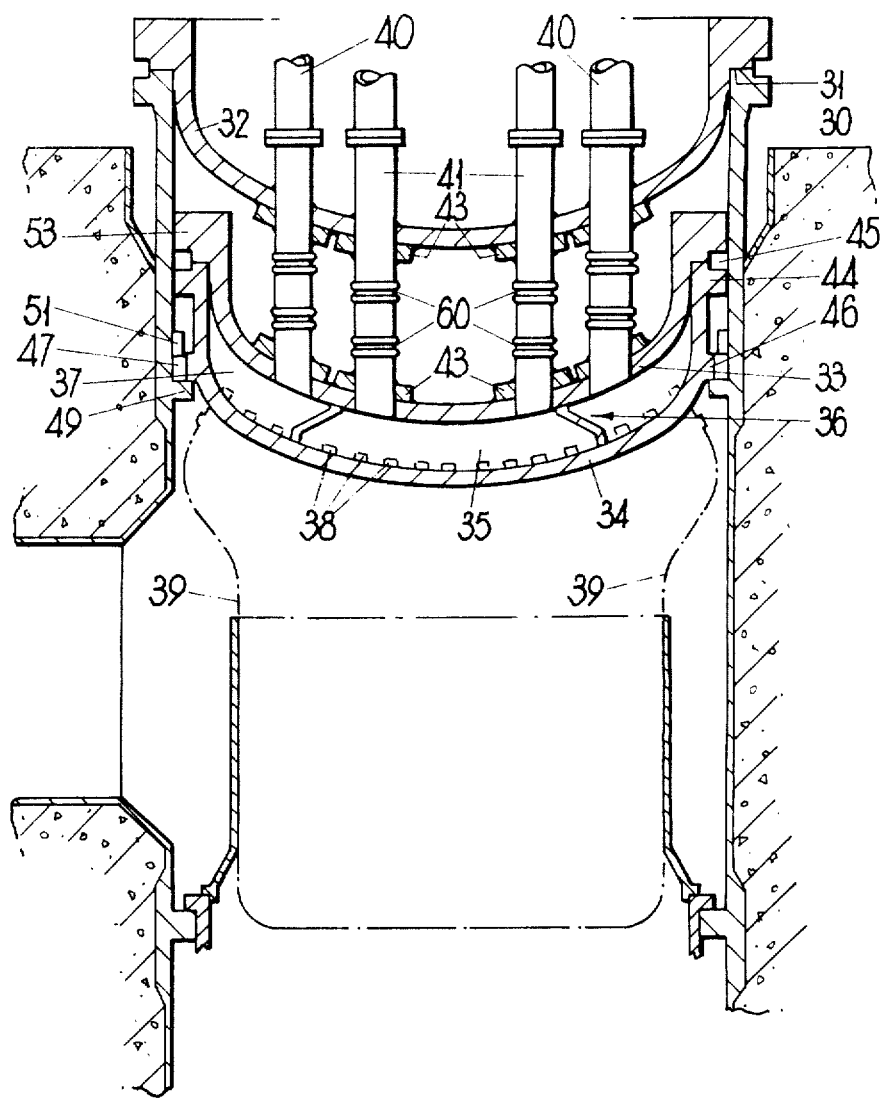
FIG. 3 is a sectional view of a modification of the arrangement shown in FIG. 2.

This, however, is not a gastight seal, and gas leaks from the bore 20 into this space, and is contained there by the primary closure plate 32. Should the plate 32 rupture, the gas from this space will escape, but escape of the gas from the bore 20 is limited to acceptable proportions by the sealing action of the ridge 49 until remedial action is taken to replace the ruptured primary closure plate. The construction of the precooler 24 shown in FIG. 3 is similar to the construction hereinbefore described except that the inlet pipes 40 and 41 are provided with expansion bellows 60 intermediate the closure plate 32 and the plate 33, to compensate for any thermal expansion which the pipes 40 and 41 may undergo.

The heat rejection cooler 21 is of similar construction as the precooler 24 and the water-box of the cooler 21 defines a secondary closure for the other end of the bore.

We claim:

1. A nuclear reactor comprising:
    A. a pressure vessel having a wall which defines a chamber accommodating a reactor core and arranged to contain gas under pressure,
    B. means providing bores penetrating the wall of the pressure vessel from outside the vessel,
    C. closure means for the bores,
    D. means providing passages interconnecting the bores and the core chamber, and
    E. turbomachinery housed within the bores and incorporating at least one heat exchanger and an associated water-box,
    F. the closure means for the bore which houses a said heat exchanger of the turbomachinery comprising i. a primary closure device which provides a gas-tight seal across the bore, and
ii. a secondary closure device extending across but not sealing the bore inwardly of the primary closure device to limit the escape of gas from the bore in the event of rupture of the primary closure device,
iii. the secondary closure device being provided by the said water-box, and
iv. the water-box comprising a pair of plates sealed together at their edges and shaped to provide a space between them, and
v. a partition separating the space into at least two chambers.

2. A nuclear reactor according to claim 1 wherein the partition is annular and divides the space into an outer chamber radially outwards of the partition and an inner chamber radially inwards of the partition.

3. A nuclear reactor comprising:
A. a pressure vessel having a wall which defines a chamber accommodating a reactor core and arranged to contain gas under pressure,
B. means providing bores penetrating the wall of the pressure vessel from outside the vessel,
C. closure means for the bores,
D. means providing passages interconnecting the bores and the core chamber, and
E. turbomachinery housed within the bores and incorporating at least one heat exchanger and an associated water-box,
F. the closure means for the bore which houses a said heat exchanger of the turbomachinery comprising
 i. a primary closure device which provides a gas-tight seal across the bore, and
 ii. a secondary closure device extending across but not sealing the bore inwardly of the primary closure device to limit the escape of gas from the bore in the event of rupture of the primary closure device,
 iii. the secondary closure device being provided by the said water-box,
 iv. a section of the bore towards one end thereof being lined by a hollow cylinder having one end adjacent the said one end of the bore,
 v. the primary closure being sealed across the said one end of the cylinder, and
 vi. the water-box extending across the hollow cylinder inwardly of the primary closure device and comprising an outer plate and an inner plate, the outer plate being disposed outwardly of the inner plate with respect to the said one end of the bore, and each plate being dishshaped such as to have a convex surface directed inwards with respect to the said one end of the bore, the inner plate having a peripheral flange which is sealed to a rim formed around the periphery of the outer plate.

4. A nuclear reactor comprising:
A. a pressure vessel having a wall which defines a chamber accommodating a reactor core and arranged to contain gas under pressure,
B. means providing bores penetrating the wall of the pressure vessel from outside the vessel,
C. closure means for the bores,
D. means providing passages interconnecting the bores and core chamber, and
E. turbomachinery housed within the bores and incorporating at least one heat exchanger and an associated water-box
F. the closure means for the bore which houses a said heat exchanger of the turbomachinery comprising
 i. a primary closure device which provides a gas-tight seal across the bore, and
 ii. a secondary closure device extending across but not sealing the bore inwardly of the primary closure device to limit the escape of gas from the bore in the event of rupture of the primary closure device,
 iii. the secondary closure device being provided by the said water-box,
 iv. a section of the bore towards one end thereof being lined by a hollow cylinder having one end adjacent the said one end of the bore,
 v. the primary closure being sealed across the said one end of the cylinder, and
 vi. the water box extending across the hollow cylinder inwardly of the primary closure device and being provided around its periphery with an annular flange having a plurality of circumferentially spaced radially extending projections, the lining cylinder is provided internally with an annular ridge forming a seating for the flange and the water-box is supported within the lining cylinder by a plurality of spaced projections which engage the projections of the water-box on the sides remote from the ridge so as to maintain the flange in contact with the ridge, the spaces between the projections of the lining cylinder being wider than those between the circumferentially spaced water-box projections, for enabling the water-box to be fitted into its operative position within the lining cylinder by axial movement to cause the water-box projections to pass between the lining cylinder projections into engagement with the ridge, followed by a partial rotation to bring cooperating surfaces of the water-box and lining cylinder projections into engagement.

* * * * *